(12) United States Patent
Fredriksson

(10) Patent No.: US 8,801,525 B2
(45) Date of Patent: Aug. 12, 2014

(54) TELESCOPIC SHAFT

(75) Inventor: Hans Fredriksson, Torshälla (SE)

(73) Assignee: Fuji Autotech AB, Eskilstuna (SE)

( * ) Notice: Subject to any disclaimer, the term of this patent is extended or adjusted under 35 U.S.C. 154(b) by 0 days.

(21) Appl. No.: 13/695,825

(22) PCT Filed: Apr. 29, 2011

(86) PCT No.: PCT/SE2011/050533
§ 371 (c)(1),
(2), (4) Date: Nov. 2, 2012

(87) PCT Pub. No.: WO2011/139217
PCT Pub. Date: Nov. 10, 2011

(65) Prior Publication Data
US 2013/0053156 A1    Feb. 28, 2013

(30) Foreign Application Priority Data

May 3, 2010   (SE) ....................................... 1050436

(51) Int. Cl.
*F16C 3/035*    (2006.01)
(52) U.S. Cl.
USPC ........................................................ 464/168
(58) Field of Classification Search
USPC ........... 464/167, 168; 384/43, 49, 54; 74/492, 74/493
See application file for complete search history.

(56) References Cited

U.S. PATENT DOCUMENTS

| 3,995,916 A | 12/1976 | Lange et al. |
| 6,343,993 B1 | 2/2002 | Duval et al. |
| 6,908,228 B2 * | 6/2005 | Dalessandro et al. .......... 384/43 |

FOREIGN PATENT DOCUMENTS

| EP | 0 518 091 A1 | 12/1992 | |
| SU | 151910 | * 1/1962 | .................... 464/168 |

* cited by examiner

*Primary Examiner* — Gregory Binda
(74) *Attorney, Agent, or Firm* — Dickstein Shapiro LLP

(57) ABSTRACT

A telescopic shaft comprises an inner shaft, an outer shaft, which defines a tube and surrounds a part of the inner shaft and which is movable in the axial direction in relation to the inner shaft, two ball tracks arranged in the inner shaft, and balls arranged in the ball tracks. Each one of the ball tracks comprises an outer ball track portion, which is partially open so that the balls are arranged to roll between the outer ball track portion and the inside of the outer shaft. The telescopic shaft comprises at least one movable ball track member and a spring member which is arranged to press the movable ball track member and the balls arranged in the ball track member against the inside of the outer shaft in order to pretension the telescopic shaft.

11 Claims, 2 Drawing Sheets

TELESCOPIC SHAFT

TECHNICAL FIELD

The present invention relates to a telescopic shaft for vehicles and a vehicle equipped with such a telescopic shaft.

DESCRIPTION

Lorries usually have spring suspended cabins which move in relation to the chassis of the vehicle. Such lorries have a lower steering wheel shaft in the form of a telescopic shaft, which automatically can change its length during travel with the vehicle, between the steering wheel and the steering gear as the steering wheel is fixable in the axial direction to the cabin of the vehicle while the steering gear is attached to the chassis of the vehicle. The telescopic shaft may be of different kinds but usually comprise an outer shaft and an inner shaft which are axially movable in relation to each other but locked in relation to each other in the turning joint of the shaft in order to be able to transmit torque from the steering wheel of the vehicle to the steering gear. Common types of telescopic shafts are ball telescopes with at least two rows of balls between the inner and the outer shaft wherein the ball rows are arranged symmetrically around the periphery of the inner shaft and wherein the balls may roll as well as slide, needle roller based telescopes with needle rollers between the inner and outer shaft, and splines telescopes without balls or roller, wherein surfaces slide against each other at a length variation of the telescope. A problem with common ball telescopes where the balls may roll and glide is that tight tolerances are required over the entire stroke which makes it difficult to maintain freedom from play at the long strokes that are required for tiltable cabins.

An example on a telescope is shown in U.S. Pat. No. 6,343,993 B1 which document primarily relates to passenger cars. In order to allow movement between the steering wheel and the steering gear splines telescopes are used according to said document. However, these are weared down unacceptably fast and also give rise to steering wheel vibrations due to so called "slip-stick". According to said document this is solved with a telescope in which elastic elements on an inner shaft press split ball tracks against the balls which in turn are pressed against an outer shaft. The telescopic shaft according to said document is constructed for short strokes in the order of 30 mm which is sufficient for use in passenger vehicles. As the balls of the telescope in said document are spring loaded slide of the balls is prevented why ball tracks which are half the length of the stroke are required for the balls to be able to roll over the entire stroke. However, in lorries with a tiltable cabin high demands are put on long stroke of the telescopic shaft to allow the cabin to be tilted. This is difficult to achieve with a telescopic shaft according to U.S. Pat. No. 6,343,993 B1 as very long ball tracks then would be required.

In U.S. Pat. No. 3,995,916 a ball telescope is shown with circulating balls between the inner and the outer shaft where the balls always roll. A similar ball telescope is described in EP 0 518 091 B1. A problem with the ball telescopes according to said documents is however that tight tolerances on the dimensions of the shafts are required in order to avoid play. Furthermore, it is difficult to avoid that play still arise with time due to wear of the components despite that the ball telescope has been produced with tight tolerances to start with.

SUMMARY OF THE INVENTION

An object of the present invention is to provide a telescopic shaft which is adapted to be arranged between the steering wheel and the steering gear in a motor vehicle, in order to absorb movements which may rise between the steering wheel and the steering gear, and a motor vehicle with such a telescopic shaft, which telescopic shaft solves at least one of the problems with telescopic shaft according to the prior art.

A further object of the present invention is to provide a telescopic shaft which is adapted to be arranged between the steering wheel and the steering gear in a motor vehicle, in order to absorb movements which may arise between the steering wheel and the steering gear, and a motor vehicle with such a telescopic shaft, which telescopic shaft enables long stroke without requiring tight tolerances on the ingoing components over large distances at the same time as play in the telescopic shaft is avoided.

At least one of these objects are provided with a telescopic shaft and a motor vehicle according to the independent claims.

Further advantages with the invention are provided with the features of the dependent claims.

According to a first aspect of the present invention a telescopic shaft for motor vehicles is provided, which shaft comprises an inner shaft with a length axis, an outer shaft with a length axis, which defines a tube and surrounds a part of the inner shaft and which is movable in the axial direction in relation to the inner shaft, two ball tracks arranged in the inner shaft, and balls arranged in the ball tracks. The inner shaft is arranged so that turning of the inner shaft in relation to the outer shaft is prevented, wherein each one of the ball tracks comprises an outer ball track portion and an inner ball track portion for returning the balls to the outer ball track portion. The outer ball track portion is partly open so that the balls which are arranged in the outer ball track portion are arranged to roll between the outer ball track portion and the inside of the outer shaft when the inner shaft is moved axially in relation to the outer shaft. The telescopic shaft is characterized in that the telescopic shaft comprises at least one movable ball track member which constitutes at least a part of the outer ball track portion and a spring member which is arranged between the inner shaft and the movable ball track member, which spring member is arranged to press the movable ball track member and the balls arranged in the ball track member against the inside of the outer shaft, in order to pretension the telescopic shaft.

By the telescopic shaft comprising at least one movable ball track member which is pressed against the inside of the outer shaft by means of a spring member good abutment of the balls against the outer shaft are provided.

It is preferred that the telescopic shaft comprises a ball holding member which is arranged fixed on the inner shaft, in which ball holding member the inner ball track portions and the outer ball track portions are arranged, and that at least one end cover which connects the inner ball track portions and the outer ball track portions at an end of the ball holding member along the length axis. Such a ball holding member may be manufactured as a separate unit which is attached on an inner shaft of suitable length. Thereby a modularized structure is provided which may easily be adapted to different lengths of telescopic shafts. By arranging an end cover on the ball holding member it is possible to manufacture the ball holding member in one piece and thereby it is possible to manufacture in particular the outer ball track portions with higher accuracy than what is the case with telescopic shafts according to the prior art.

The movable ball track member may be divided and comprise two parallel ball track halfs, the length axes of which are arranged essentially parallelly to the length axis of the inner shaft. By dividing the ball track member in two parallel ball track halfs the two ball track halfs will be pressed against the walls when they are arranged in a track in the inner shaft. Thereby play is eliminated against the inner shaft and thereby the manufacturing tolerances may be made less strict.

The movable ball track member may be arranged in a track in the inner shaft, which track is arranged parallelly to the length axis of the inner shaft. By arranging the movable ball track member in a grove in the inner shaft a stable attachment of the movable ball track member is provided.

The spring member may be designed in any one of a large number of ways. According to an embodiment the spring member is comprised of at least one cup spring. The spring member may of course comprise a large number of cup springs. As an alternative to cup springs the spring member may comprise helical springs or any other suitable sort of spring.

The outer shaft may comprise groves on the inside which extend parallelly to the length axis, with which groves the balls in the outer ball track portions are arranged to interact. With such groves a barrier is provided which prevents rotation of the inner shaft in relation to the outer shaft.

The means for preventing rotation of the inner shaft in relation to the outer shaft may at least partly be constituted by interaction between the outer ball track portions, the balls and the grooves on the inside of the outer shaft. The balls which interact with the grooves in the outer shaft have the range of movement limited by the outer ball track portions.

The ball holding member may be provided with fixed protrusions and the outer shaft may be provided with grooves which are arranged to interact with the fixed protrusions in order to provide further means for preventing rotation of the inner shaft in relation to the outer shaft. Alternatively, this may be the only means for preventing rotation of the inner shaft in relation to the outer shaft. In the latter case, the balls do not interact with any groove in the outer shaft.

The telescopic shaft may comprise an elastic insert member between the movable ball track member and the inner shaft. This results in a more quiet and smooth function of the telescopic shaft by damping transmission of vibrations and sound from the chassis of the vehicle to the steering wheel.

The elastic insert member may be constituted of an elastic insert for each one of the ball track halfs. This facilitates assembly of the insert member.

The elastic insert member may be made of any suitable material. According to a preferred embodiment the insert member is made of plastic.

The telescopic shaft preferably comprises only two ball tracks, the outer portions of which are diametrically opposite to each other in relation to the length axis. Such a telescopic shaft gives a satisfying function at a low cost.

According to a second aspect of the present invention a motor vehicle is provided comprising a plurality of wheels, of which at least two wheels are wheels for steering, a steering gear to which the wheels for steering are connected, a steering wheel, and a telescopic shaft according the first aspect of the present invention arranged between the steering gear and the steering wheel.

SHORT DESCRIPTION OF THE DRAWINGS

In the following preferred embodiments of the invention will be described with the reference to the appended drawings on which:

DESCRIPTION OF PREFERRED EMBODIMENTS

Figure 1:
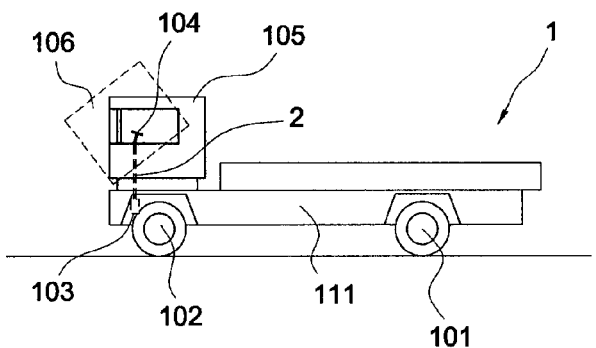
FIG. 1 shows a motor vehicle in which a telescopic shaft according to the invention is arranged.

In the following description of preferred embodiments of the invention the same reference numeral will be used for the same feature in the different figures. The figures are not drawn to scale.

FIG. 1 shows a motor vehicle 1 in which a telescopic shaft 2 according to the present invention is arranged. The motor vehicle comprises back wheels 101 and front wheels 102 which are wheels for steering. The motor vehicle comprises a steering gear 103 to which the wheels for steering 102 are connected, a steering wheel 104, and a telescopic shaft 2 arranged between the steering gear 103 and the steering wheel 104. The motor vehicle 1 comprises a tiltable cabin which is shown in its normal position of use with the solid line 105 and in its tilted position with the dotted line 106. The telescopic shaft 2 comprises a first attachment 107 arranged to be connected to the steering wheel 104 and a second attachment 108 which is arranged to be connected to the steering gear 103. The motor vehicle also comprises a chassis 111. The cabin is resiliently suspended in the chassis 111.

Figure 2:
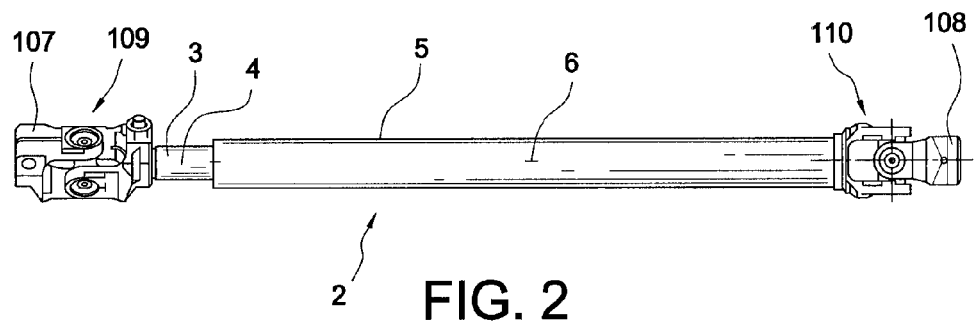
FIG. 2 shows a telescopic shaft according to an embodiment of the present invention.
Figure 3:
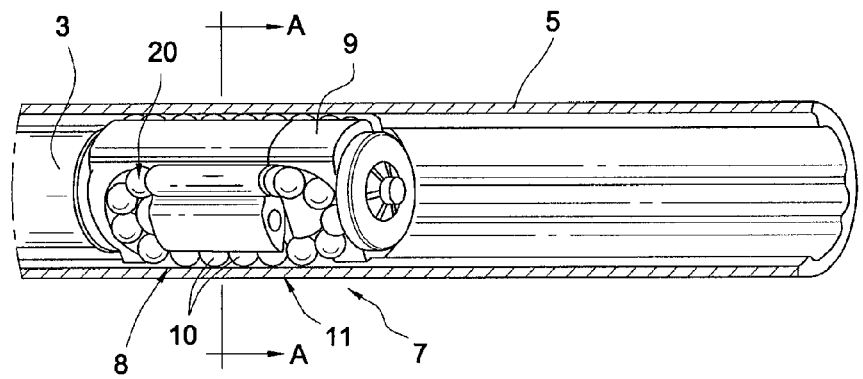
FIG. 3 shows partly in cross section a part of the telescopic shaft in FIG. 2 and shows more specifically a ball holding member which is arranged at the end of an inner shaft.
Figure 4:
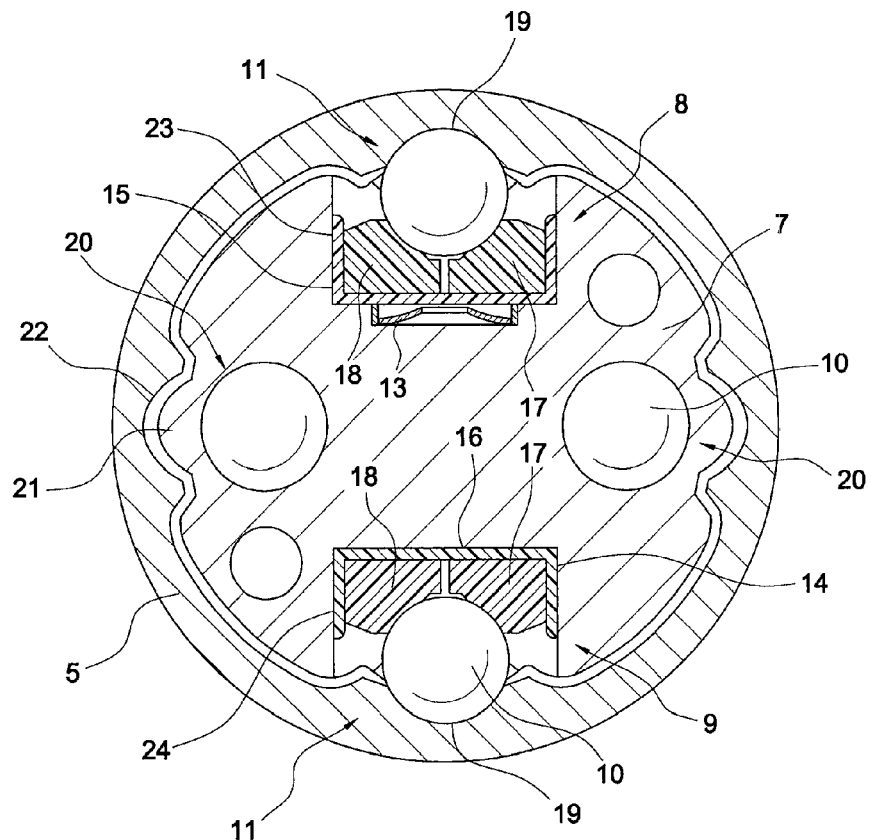
FIG. 4 shows the telescopic shaft in cross section along line A-A of FIG. 3 perpendicularly to the length axis according to a first embodiment of the invention.

FIG. 2 shows a telescopic shaft 2 according to an embodiment of the invention, which may be arranged in a motor vehicle 1 according to FIG. 1. The telescopic shaft 2 comprises an inner shaft 3 with a length axis 4, an outer shaft 5 with a length axis 6, which defines a tube and surrounds a part of the inner shaft 3 and which is movable in the axial direction in relation to the inner shaft 3. FIG. 3 shows partly in cross section a part of the telescopic shaft 2 in FIG. 2. FIG. 4 shows in cross section perpendicularly to the length axis 6 the inner shaft 3 and the outer shaft 5. The first attachment 107 is connected to the inner shaft by means of a first cross pin joint 109. In the corresponding way, the second attachment 108 is connected to the outer shaft by means of a second cross pin joint 110. In the end of the inner shaft 3 which is surrounded by the outer shaft 5 there is arranged a ball holding member 7 with two ball tracks 8, 9. In each one of the ball tracks 8, 9, a plurality of balls 10 are arranged to circulate during movement of the inner shaft 3 in relation to the outer shaft 5. Each one of the ball tracks 8, 9, comprises an outer ball track portion 11, and an inner ball track portion 20 for return of the balls 10 to the outer ball track portion 11, wherein the outer ball track portion 11 is partly open so that the balls 10 which are arranged in the outer ball track portion 11 are arranged to roll between the outer ball track portion 11 and the inside of the outer shaft 5 when the inner shaft 3 is moved axially in relation to the outer shaft 5. The telescopic shaft 2 comprises a first movable ball track member 12 which constitutes at least a part of the outer ball track portion 11 and a spring member 13 which is arranged between the ball holding member 7 and the first movable ball track member 12. The telescopic shaft 2 also comprises a second ball track member 14 which, however, is not movable in relation to the ball holding member 7. The first movable ball track member 12 is arranged in a first groove 15 in the inner shaft, which groove 15 is arranged in parallel with the length axis 4 of the inner shaft. In the corresponding way, the second ball track member 14 is arranged in a second groove 16 on the opposite side of the ball holding member 7. In the shown embodiment the ball track members are constituted by two ball track halves 17, 18. The spring member 13 is arranged to press the first ball track member 12 and the balls 10 arranged in the ball track member 12 against the inside of the outer shaft 5, in order to pretension the telescopic shaft 2. In the shown embodiment the spring members 13 are cup springs.

The outer shaft 5 comprises grooves 19 on the inside which extend parallelly to the length axis 6, which grooves 19 the balls 10 in the outer ball track portion 11 are arranged to interact with. Thereby, turning of the inner shaft 3 in relation to the outer shaft 5 is prevented. The ball holding member 7 is provided with fixed protrusions 21 and the outer shaft 5 is provided with grooves 22 which are arranged to interact with the fixed protrusions 21 in order to provide further means for preventing rotation of the inner shaft 3 in relation to the outer shaft 5. A first elastic insert member 23 is arranged between the first movable ball track member 12 and the ball holding member 7. A second elastic insert member 24 is arranged between the second ball track member 14 and the ball holding member 7. The elastic insert members 23, 24, are according to a preferred embodiment made of plastic. The elastic insert member may be divided in a plurality of parts.

Figure 5:
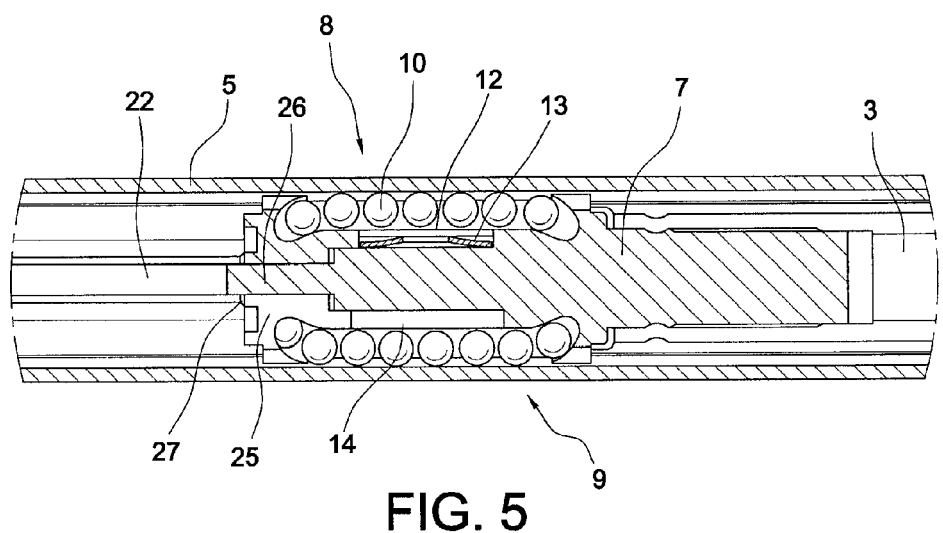
FIG. 5 shows the telescopic shaft in cross section along the length axis according to an embodiment of the invention.

FIG. 5 shows the telescopic shaft in cross section along the length axis according to an embodiment of the invention. The inner shaft 3 comprises a tube. In the end of the tube there is arranged a ball holding member 7 which is inserted into the tube. In FIG. 5 the first ball track 8 and the second ball track 9 are shown. The ball tracks are formed by the ball holding member 7 and an end cover 25. In the first ball track 8 the first movable ball track member 12 is arranged to be pressed against the outer shaft 5 by means of the spring members 13. In the second ball track 9 the second ball track member 14 is arranged to guide the balls. The ball holding member 7 has an end cover 26 which extends through the end cover 25. On the outer end of the end portion 26 there is arranged a lock member 27 which prevents the end cover 25 from detaching from the end portion 26.

The function of a telescopic shaft according to the described embodiments will now be described. During travel with the motor vehicle bumps in the road will result in the cabin 105 moving in relation to the chassis 111. This will result in the steering wheel 104 moving in relation to the steering gear 103. These movements between the steering wheel and the steering gear 103 will be absorbed by the telescopic shaft 2, by the inner shaft 3 being able to move axially in relation to the outer shaft 5. For movements between the inner shaft 3 and outer shaft 5 the balls 10 in the ball tracks 8, 9 will be held in contact with the outer shaft 5 thanks to the spring member 13 pressing the balls in the outer portion 11 of the first ball track 8 against the outer shaft 5. When the inner shaft 3 is moved in relation to the outer shaft 5 this will result in the balls in the ball tracks 8, 9, to move around between the inner and the outer shaft. Thus, the stroke is not limited by the length of the ball tracks. This means that the telescopic shaft easily may absorb the large movement which arises when the cabin is tipped.

The described embodiments may be modified in many ways without departing from the spirit of scope of the present invention, which is limited only by the appended claims.

It is of course possible to arrange more than two ball tracks in the ball holding member.

The telescopic shaft is typically 0.1-3 meters long. Preferably the telescopic shaft is 0.5-2 meters long.

The telescopic shaft may have a diameter of 0.01-0.2 meters, but typically has a diameter of 0.02-0.1 meters. Preferably, the telescopic shaft has a diameter of 0.03-0.06 meters.

The invention claimed is:

1. Telescopic shaft for motor vehicles, which comprises:
an inner shaft with a length axis,
an outer shaft with a length axis, which defines a tube and surrounds a part of the inner shaft and which is movable in the axial direction in relation to the inner shaft,
two ball tracks arranged in the inner shaft, and
balls arranged in the ball tracks,
wherein the inner shaft is arranged so that turning of the inner shaft in relation to the outer shaft is prevented,
wherein each one of the ball tracks comprises an outer ball track portion and an inner ball track portion for returning the balls to the outer ball track portion,
wherein the outer ball track portion is partly open so that the balls which are arranged in the outer ball track portion are arranged to roll between the outer ball track portion and the inside of the outer shaft when the inner shaft is moved axially in relation to the outer shaft,
wherein the telescopic shaft comprises a ball holding member which is arranged fixed on the inner shaft, in which ball holding member the inner ball track portions and the outer ball track portions are arranged, at least one end cover which connects the inner ball track portions and the outer ball track portions in one end of the ball holding member along the length axis, at least one movable ball track member which constitutes at least a part of the outer ball track portion and a spring member which is arranged between the inner shaft and the movable ball track member, which spring member is arranged to press the movable ball track member and the balls arranged in the ball track member against the inside of the outer shaft, in order to pretension the telescopic shaft.

2. Telescopic shaft according to claim 1, wherein the movable ball track member is arranged in a groove in the inner shaft, which groove is arranged in parallel with the length axis of the inner shaft.

3. Telescopic shaft according to claim 1, wherein the movable ball track member comprises two parallel ball track halves, the length axes of which are arranged essentially in parallel with the length axis of the inner shaft.

4. Telescopic shaft according to claim 1, wherein the spring member is constituted by at least one cup spring.

5. Telescopic shaft according to claim 1, wherein the outer shaft comprises grooves on the inside which extend in parallel with the length axis, which grooves the balls in the outer ball track portions are arranged to interact with.

6. Telescopic shaft according to claim 5, wherein the means for preventing rotation of the inner shaft in relation to the outer shaft at least partially is constituted by interaction between the outer ball track portions, the balls and the grooves on the inside of the outer shaft.

7. Telescopic shaft according to claim 1, wherein the ball holding member is provided with fixed protrusions and the outer shaft is provided with grooves which are arranged to interact with the fixed protrusions in order to provide further means for preventing rotation of the inner shaft in relation to the outer shaft.

8. Telescopic shaft according to claim 1, comprising an elastic insert member between the movable ball track member and the inner shaft.

9. Telescopic shaft according to claim 8, wherein the elastic insert member is made of plastic.

10. Telescopic shaft according to claim 1, only comprising two ball tracks, the outer portions of which are diametrically opposite each other in relation to the length axis.

11. Motor vehicle comprising a plurality of wheels, of which at least two wheels are wheels for steering, a steering gear to which the wheels for steering is connected, a steering wheel, and a telescopic shaft according to claim 1, arranged between the steering gear and the steering wheel.

* * * * *